United States Patent Office 2,903,490
Patented Sept. 8, 1959

2,903,490

ALKYLATION OF SATURATED HYDROCARBONS

Herbert R. Appell, North Riverside, Ill., assignor, by mesne assignments, to Universal Oil Products Company, Des Plaines, Ill., a corporation of Delaware No Drawing. Application March 14, 1957
Serial No. 645,925

20 Claims. (Cl. 260—666)

This invention relates to a process for the alkylation of paraffin hydrocarbons in the presence of a novel catalyst. More particularly, this invention relates to the alkylation of an alkylatable saturated hydrocarbon with an olefin-acting compound at alkylating conditions in the presence of an alkylation catalyst comprising a physical mixture of a metal halide of the Friedel-Crafts type and a Raney nickel alloy.

An object of this invention is to produce alkylated paraffin hydrocarbons and particularly to produce isoparaffin hydrocarbons. A specific object of this invention is to produce substantially saturated gasoline boiling range hydrocarbons having high anti-knock values which may be utilized as such or as components of gasoline suitable for use in airplane or automobile engines.

Numerous catalysts have been proposed for the alkylation of paraffin hydrocarbons with olefin-acting compounds including liquid catalysts such as sulfuric acid, hydrogen fluoride, etc. Similarly, solid catalysts such as aluminum chloride, aluminum bromide, metal oxides, metal sulfides, and clays have been proposed at catalysts for this reaction. Each of these prior art catalysts suffers from at least one inherent disadvantage and it is a further object of this invention to provide an alkylation catalyst which overcomes each and all of such disadvantages. For example, the prior art teaches that the above-mentioned liquid catalysts are not satisfactory alkylation catalysts for the reaction of isobutane with ethylene. Sulfuric acid is not a satisfactory catalyst for the alkylation of isobutane with propylene. In addition, sulfuric acid has the inherent disadvantage that rapid deterioration of the catalyst takes place during use. Large amounts of sludge formation, an undesirable side reaction occur when aluminum chloride alone is used in the alkylation reaction. Metal oxides, clays, etc., which are stable solid catalysts can only be utilized at high temperatures and high pressures. The use of the novel catalyst of the present invention overcomes these and other disadvantages which are well known to one skilled in the art.

In one embodiment the present invention relates to the alkylation of an alkylatable saturated hydrocarbon with an olefin-acting compound at alkylating conditions in the presence of a catalyst comprising a physical mixture of a metal halide of the Friedel-Crafts type and a Raney nickel alloy.

Another embodiment of the present invention relates to the alkylation of an alkylatable acyclic paraffin hydrocarbon with an olefin-acting compound at alkylating conditions in the presence of a catalyst comprising a physical mixture of a metal halide of the Friedel-Crafts type and a Raney nickel alloy.

A further embodiment of the present invention relates to the alkylation of an alkylatable cyclic paraffin hydrocarbon with an olefin-acting compound at alkylating conditions in the presence of a catalyst comprising a physical mixture of a metal halide of the Friedel-Crafts type and a Raney nickel alloy.

A still further embodiment of this invention relates to the alkylation of an isoparaffinic hydrocarbon with an olefinic hydrocarbon at alkylating conditions in the presence of a catalyst comprising a physical mixture of a metal halide of the Friedel-Crafts type and a Raney nickel alloy.

A specific embodiment of the present invention relates to the alkylation of isobutane with ethylene at alkylating conditions in the presence of a catalyst comprising a physical mixture of aluminum chloride and a Raney nickel alloy.

Another specific embodiment of the present invention relates to the alkylation of isobutane with propylene at alkylating conditions in the presence of a catalyst comprising a physical mixture of aluminum chloride and a Raney nickel alloy.

A still further specific embodiment of the present invention relates to the alkylation of isobutane with a butene at alkylating conditions in the presence of a catalyst comprising a physical mixture of aluminum chloride and a Raney nickel alloy.

An additional specific embodiment of the present invention relates to the alkylation of methylcyclohexane with propylene at alkylating conditions in the presence of a catalyst comprising a physical mixture of aluminum chloride and a Raney nickel alloy.

Other embodiments of the present invention will become apparent in considering the specification as hereinafter set forth.

I have found that a catalyst composition useful in the alkylation of saturated hydrocarbons reaction may be prepared by commingling a metal halide of the Friedel-Crafts type and a Raney nickel alloy. While the catalyst of the present invention includes a metal halide of the Friedel-Crafts type, the catalyst possesses properties superior to those of a metal halide of the Friedel-Crafts type alone. These superior properties which result from a simple physical mixture of a metal halide of the Friedel-Crafts type and a Raney nickel alloy are indeed surprising. As will be illustrated in the examples appended to the present specification, the catalyst of the present invention gives results different than are obtained by the use of a metal halide of the Friedel-Crafts type alone, but under conditions of temperature, pressure, etc., ordinarily utilized for a metal halide of the Friedel-Crafts type. For example, sludge formation which is a serious detriment to the commercial utilization of a metal halide of the Friedel-Crafts type in the alkylation of saturated hydrocarbons reaction is minimized or negligible or for all practical purposes eliminated by the use of the mixed catalyst composition of the present invention. Furthermore, Raney nickel alloys are ordinarily considered to have little or no catalytic activity in the alkylation of saturated hydrocarbons reaction under conditions ordinarily employed for the catalysts of the Friedel-Crafts type. Thus, a Raney nickel alloy comprising 52.2 weight percent nickel and 47.8 weight percent aluminum of the formula $NiAl_2$ has little or no activity for the alkylation of isobutane with ethylene, propylene, or a butene under the conditions normally utilized for such alkylation using aluminum chloride as the catalyst. It is therefore surprising that Raney nickel alloys enhance the activity of metal halides of the Friedel-Crafts type under conditions ordinarily utilized for catalysts of the Friedel-Crafts type alone because such Raney nickel alloys themselves exhibit substantially little or no catalytic activity at such conditions for said reaction. Furthermore, it has been suggested in the prior art to utilize certain porous materials as supports for metal halides of the Friedel-Crafts type. Such porous supports include alumina, clays, various naturally occurring silica-aluminas such as kieselguhr, etc. While metal halides of the Friedel-Crafts type such as aluminum chloride can be supported on these porous materials with the resultant production of solid supported aluminum chloride catalysts, these resultant catalysts have an unfortunate inherent disadvantage since these supports tend to adsorb sludge formed in the reaction. Thus, they have very short lives in use. Not only does this adsorption of sludge lead to catalyst deactivation but it also apparently accelerates the formation of additional sludge. The catalyst compositions of the present invention do not suffer from this disadvantage and therefore are extremely desirable for use in continuous processes operating for long periods of time.

As hereinbefore set forth, the novel catalyst for the alkylation of saturated hydrocarbons reaction comprises a physical mixture of a metal halide of the Friedel-Crafts type and a Raney nickel alloy. The metal halide of the Friedel-Crafts type preferably comprises aluminum chloride. Other metal halides of the Friedel-Crafts type included within the scope of the present invention are aluminum bromide, zinc chloride, zirconium chloride, gallium chloride, titanium chloride, ferric chloride, antimony chloride, bismuth chloride, and others which are well known to one skilled in the art.

As set forth hereinabove, the metal halide of the Friedel-Crafts type is utilized in physical admixture with a Raney nickel alloy in the alkylation process of the present invention. These Raney nickel alloys are not to be confused with Raney nickel catalysts which are prepared from such alloys. These nickel alloys contain various other components such as silicon, aluminum, magnesium, and zinc which components are ordinarily considered the reactive components which are removed in one manner or another during the use of these alloys in the preparation of the Raney nickel catalysts. The Raney nickel alloys included within the scope of the present invention are described in U.S. Patent 1,563,787, U.S. Patent 1,628,191, and U.S. Patent 1,915,473, and Canadian Patent 315,299 and French Patent 729,357. Similar alloys are also described by different inventors in German Patent 408,811 and British Patent 282,112 and in Russian Patent 38,127. Particularly preferred alloys have the composition $NiAl_2$, containing 52.1% nickel and melting at 1400° C., and the composition $NiAl_3$ containing 42% nickel and melting at 1130° C. The alloys can be prepared by comparatively simple means, particularly when using aluminum along with nickel, because the fusion of aluminum with nickel is strongly exothermic. It is sufficient to melt the aluminum and then to heat the melt at 900 to about 1200° C. The melt is protected against oxidation by an inert gas or by one of the salt fluxes used in working with aluminum. On introduction of the nickel component enough heat is generated to reach the fusion temperature of the alloy. For example, when nickel is added to aluminum which has been preheated to 900° C. to about 1200° C., the temperature rises to about 1500° C. This temperature is higher than is actually necessary to give nickel-aluminum alloy. The alloys can also be produced from nickel oxides and aluminum powder in a thermite process. In general, the nickel-aluminum alloys will contain from about 10 to about 85% nickel and from about 15 to about 90% aluminum. For all practical purposes, an alloy range of 30 to about 50% by weight of nickel seems to be most suitable. Laboratory directions for the preparation of a suitable alloy are given by Paul and Hilly, Bull. Soc. Chim. 3, 2330 (1936). A Raney nickel alloy having the general formula $NiAl_2$ is available commercially in the United States and is suitable for use in the process of the present invention. The physical mixtures of a metal halide of the Friedel-Crafts type and a Raney nickel alloy are hygroscopic and their contact with water or moisture in the atmosphere should be minimized for maximum catalytic activity.

The physical mixture of a metal halide of the Friedel-Crafts type and a Raney nickel alloy, may be formed in any suitable manner. In one method, for example, aluminum chloride and $NiAl_2$ are physically mixed by grinding together in a mortar or with a ball mill or other type of grinding apparatus. In another method, granules of aluminum chloride and a Raney nickel alloy are merely physically commingled. In addition, it may be desirable to form a catalyst bed or zone as fixed bed for a continuous type of process, in which catalyst bed or zone the metal halide of the Friedel-Crafts type and the Raney nickel alloy are placed in alternating layers. In some cases, the metal halide of the Friedel-Crafts type may be a liquid and in such instances the requisite amount of metal halide of the Friedel-Crafts type may be sublimed on the Raney nickel alloy to form a solid catalytic mass.

The preferred catalyst mixtures which are granular solids at ordinary temperatures are preferably utilized as such, but in some cases it may be desirable to utilize said mixtures with carrying or spacing materials of relatively inert character such as various prepared forms of aluminum oxide, various silicas, activated carbon or char, silicate minerals, synthetic silica-alumina type composites, and acid treated kaolin group minerals such as, for example, the acid treated montmorillonites of commerce some of which are known as "Filtrol," "Tonsil," etc. The preferred catalytic composites may also be prepared in the presence of these carriers or spacing materials in a relatively finely divided condition so that an intermediate mixture of catalyst and carrier or spacing material is produced, or they may be prepared separately and used to surface prepared granules, or mixed with finely divided carriers and formed into particles or pellets by extrusion procedures.

In contrast to the metal halides of the Friedel-Crafts type, the catalysts of the present invention do not form substantial amounts of complexes with unsaturated hydrocarbons and, accordingly, they may be used in continuous processes over long periods of time with relatively little compensation by such complexes so that in most instances the catalyst life is considerably longer than the life of the corresponding metal halide of the Friedel-Crafts type in similar types of hydrocarbon conversion reactions.

As hereinbefore set forth, the novel catalyst for the alkylation of saturated hydrocarbons reactions of the present invention comprises a physical mixture of a metal halide of the Friedel-Crafts type and a Raney nickel alloy. The proportions of Raney nickel alloy and metal halide of the Friedel-Crafts type may vary over a wide range. Thus, from about 0.5 to about 50% by weight of metal halide of the Friedel-Crafts type based on the Raney nickel alloy is utilized. Excellent results have been obtained by the utilization of from about 5 to about 20% by weight of metal halide of the Friedel-Crafts type, for example, aluminum chloride, based on a Raney nickel alloy having the formula $NiAl_2$.

As hereinbefore set forth, the present invention relates to a process for the alkylation of an alkylatable saturated hydrocarbon with an olefin-acting compound at alkylating conditions in the presence of a catalyst comprising a physical mixture of a metal halide of the Friedel-Crafts type and a Raney nickel alloy. Many saturated hydrocarbons are utilizable as starting materials in this process. Preferred paraffin hydrocarbons are isoparaffins and naphthenic hydrocarbons containing one or more alkyl groups. Suitable paraffin hydrocarbons include isobutane, isopentane, 2-methylpentane, 3-methylpentane, 2,3-dimethylbutane, 2-methylhexane, 3-methylhexane, 2-methylheptane, 3-methylheptane, etc., and other isoparaffins containing at least one tertiary carbon atom. Cyclic paraffin hydrocarbons suitable as starting materials include methylcyclopentane, methylcyclohexane, etc.

Isobutane is the isoparaffin commonly subjected to alkylation commercially, although higher molecular weight isoparaffins also react with olefin-acting compounds under similar or modified conditions of operation to produce branched chain paraffinic hydrocarbons of a higher boiling point than the isoparaffinic hydrocarbons charged to the process. However, as the higher molecular weight isoparaffins such as isopentane, isohexane, etc., are themselves valuable constituents of high antiknock gasoline, they are consequently less commonly used than isobutane as charging stocks for the alkylation process. Of the various naphthenic hydrocarbons which may be alkylated in the presence of the catalyst described herein to produce naphthenic hydrocarbons of more highly branched chain structure, methylcyclopentane and its alkyl derivatives are commonly employed in such alkylation; however, cyclopentane and cyclohexane and alkyl derivatives of cyclohexane containing at least one tertiary carbon atom may also be utilized to advantage. The resulting alkylates are utilizable as such or as components for high antiknock gasoline. In the alkylation reaction, normal paraffins such as n-butane, n-pentane, n-hexane, n-heptane, etc. are utilizable to varying extents depending upon the degree of isomerization of the normal paraffinic hydrocarbon prior to the alkylation reaction. Since the catalyst of the present invention is extremely active, such combination isomerization-alkylation reactions are not surprising and are thus within the generally broad scope of this invention.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates and also esters of various organo carboxylic acids. The preferred olefin-acting compounds are olefinic hydrocarbons which comprise monoolefins having one double bond per molecule and polyolefins which have more than one double bond per molecule. Monoolefins which may be utilized for alkylating paraffin hydrocarbons in the presence of a catalyst comprising a physical mixture of a Raney nickel alloy and a metal halide of the Friedel-Crafts type are either normally gaseous or normally liquid and include ethylene, propylene, 1-butene, 2-butene, isobutylene, pentenes, and higher molecular weight normally liquid olefins, the latter including various olefin polymers having from about 6 to about 18 carbon atoms per molecule. Cycloolefins such as cyclohexene, cyclopentene, and various alkyl cycloolefins may also be utilized but generally not under the same conditions of operation applying to the acyclic olefins. The polyolefinic hydrocarbons utilizable in the process of the present invention include conjugated diolefins such as butadiene and isoprene, as well as non-conjugated diolefins, and other polyolefinic hydrocarbons containing more than 2 double bonds per molecule.

Alkylation of the above-described alkylatable saturated hydrocarbons may also be effected in the presence of the hereinabove-referred-to catalyst by reacting saturated hydrocarbons with certain substances capable of producing olefinic hydrocarbons under the conditions of operation chosen for the process. Such olefin-producing substances include alkyl halides capable of undergoing dehydrohalogenation to some olefinic hydrocarbons containing at least 2 carbon atoms per molecule. The alkyl halides comprise a particularly desirable group of compounds which act as olefins in admixture with alkylatable paraffin hydrocarbons and the catalyst of the present invention, since in the reaction hydrogen halide is produced. Such hydrogen halide is often a desirable component in the process of the present invention, and in some cases is added directly. Also, in other cases, it is desirable to utilize mixtures of the above-described olefin-acting compounds and alkyl halides. A specific example of such a mixture is propylene and isopropyl chloride, or a butene and isopropyl chloride or secondary butyl chloride. In such a case, olefinic hydrocarbons and the above-mentioned olefin-producing substances are herein-referred-to as olefin-acting compounds.

In accordance with the process of the present invention, the alkylation of saturated hydrocarbons reaction to produce hydrocarbons of more highly branched chain structure and of higher molecular weight than the hydrocarbons charged to the process is effected in the presence of the above-indicated catalyst at a temperature of from about −30° C. to about 125° C. or higher, and preferably from about 0° C. to about 75° C., although the exact temperature needed for the particular alkylation reaction will depend upon the specific reactants employed and upon the specific catalyst utilized as well as the quantity thereof.

The alkylation reaction is usually carried out at a pressure of from about substantially atmospheric to approximately 100 atmospheres and preferably under sufficient pressure to maintain the reactants and products in substantially liquid phase. In the hydrocarbon mixture subjected to alkylation, it is preferable to have present about 2 to about 10 or more, sometimes up to 20, and sometimes even up to 100 or more, molecular proportions of alkylatable paraffin hydrocarbon for one molecular proportion of olefin-acting compound introduced thereto, particularly olefin hydrocarbons. Higher molecular ratios of alkylatable paraffin hydrocarbon to olefin are especially desirable when the process is employed for the alkylation of a high molecular weight olefin boiling generally higher than pentenes, since these olefins frequently undergo depolymerization prior to or substantially simultaneously with alkylation so that one molecular proportion of such an olefin can thus alkylate two or more molecular proportions of alkylatable paraffin hydrocarbon. The high molecular ratios of alkylatable paraffin hydrocarbon to olefin also tend to reduce polymerization of the olefin (particularly low molecular weight olefins) and to reduce the formation of polyalkylated products because of the operation of the law of mass action. In some cases, it may be desirable to maintain or employ an atmosphere of hydrogen within the reaction zone, or in some cases it may be desirable to maintain or employ an atmosphere of nitrogen or other inert gas.

In converting paraffin hydrocarbons to effect the alkylation thereof with the type of catalysts hereinabove described, either batch or continuous operations may be employed. The actual operation of the process admits to some modification depending upon the normal phase of the reacting constituents and whether batch or continuous operations are employed.

In a simple type of batch operation, a paraffin hydrocarbon to be alkylated, such as, for example, isobutane, is brought to a temperature within the approximate range specified in the presence of a catalyst comprising a physical mixture of a metal halide of the Friedel-Crafts type and a Raney nickel alloy having concentration corresponding to a sufficiently high activity, and alkylation is effected by the gradual introduction under pressure of an olefin such as, 2-butene, in a manner to attain contact by the catalyst and the reactants compounds.

In another method of operation, the paraffin hydrocarbon may be mixed with an olefin at a suitable temperature, the catalyst comprising a physical mixture of a Raney nickel alloy such as $NiAl_2$ and a metal halide of the Friedel-Crafts type such as aluminum chloride is added and the reaction of alkylation is induced by sufficiently long contact with the catalyst. Alkylation may be allowed to progress to different stages depending upon contact time. In the case of alkylation of isobutane with normally gaseous olefins, the best results from the standpoint of motor fuel usually are produced by the condensation of equimolar quantities of paraffin hydrocarbons and olefins. After a batch treatment, the hydrocarbons are separated from the catalyst in any suitable manner such as by decantation or quenching with water and the hydrocarbon fraction or layer is then subjected to fractionation for the recovery of an intermediate boiling hydrocarbon fraction utilizable as motor fuel.

In one type of continuous operation, a liquid isoparaffin may be pumped through a reactor containing the physically mixed catalyst per se or further commingled with a suitable support. The olefin-acting compound may be added to the isoparaffin stream just prior to contact of this stream with the solid catalyst bed, or it may be introduced in multi-stages at various points in the catalyst bed. It is also within the scope of the present invention to add a hydrogen halide such as hydrogen chloride or hydrogen bromide to the process of the present invention, the addition being carried out either continuously or intermittently. In such an operation, the original paraffin hydrocarbon stream such as isobutane may contain sufficient dissolved hydrogen chloride to induce the desired catalytic activity of the physical mixture comprising aluminum chloride and a Raney nickel alloy and after this desired catalytic activity has been induced in situ, the paraffin hydrocarbon stream can be utilized without prior contacting or combination with hydrogen chloride. Instead of hydrogen chloride, an alkyl halide, such as isopropyl chloride, which undergoes dehydrohalogenation under the conditions of the reaction may be utilized. The details of continuous processes of this general character are familiar to one skilled in refinery operations and any necessary additions or modifications will be more or less obvious and can be made without departing from the generally broad scope of this invention.

The process of the present invention is illustrated by the following examples which are introduced for the purpose of illustration and with no intention of limiting the generally broad scope of the present invention.

EXAMPLE I

This example illustrates a comparison of the utilization of aluminum chloride alone and the utilization of a physical admixture of aluminum chloride and Raney nickel alloy, the comparison being made for the alkylation of isobutane with 2-butene. These experiments were carried out at temperatures ranging from about 25° C. to about 35° C. and at pressures ranging from about 50 to about 100 pounds per square inch. The conditions for the reactions, quantities of reactants utilized, and results obtained are summarized in the following Table I.

cent isopropyl chloride was added to the autoclave. This amount of isobutane is equivalent to about 1 mol. Stirring was initiated and 400 cc. of charge stock containing isobutane and 2-butene was added. The analysis of the charge stock is as follows: isobutane, 77.9 mol percent; 2-butene, 18.3 mol percent; and n-butane, 3.8 mol percent. A mol ratio of isobutane to 2-butene in the charge stock is about 4 to 1 and with the isobutane originally added to the reactor the isobutane to 2-butene ratio in the reactor was about 5.5 to 1. The charge stock was added to the autoclave over a 25 minute period. The initial temperature was 24° C. and this rose to a maximum of 30° C. during the addition period. The initial pressure of 55 p.s.i.g. rose to 95 p.s.i.g. in the same time. The stirring was continued for an additional 5 minutes' time. The gases were then vented from the autoclave at a temperature of about 30° C. which was maintained by the use of warm water. The autoclave was then disconnected from the stirrer and the liquid product recovered therefrom. From Table I it can be seen that a yield of 174 weight percent $C_5+$ liquid product was obtained using aluminum chloride alone as the catalyst. This yield as are the other yields hereinafter discussed was calculated by dividing the quantity of $C_5+$ liquid product by the quantity of 2-butene charged to the reactor. It should be noted that 3.9 grams of bottoms or sludge were also formed in this experiment utilizing aluminum chloride alone as the catalyst.

Run 2.—This experiment illustrates the beneficial effect obtained by the utilization of the novel catalyst composition of the present invention. In this experiment and in all of the following runs, the specified quantity of aluminum chloride was ground together with the specified quantity of Raney nickel alloy in a mortar. The Raney nickel alloy utilized in the preparation of these catalysts analyzed as $NiAl_2$ containing about 52% by weight of nickel and about 48% by weight of aluminum. The charge stock utilized in runs 2, 3, and 4 contain 77 mol percent isobutane, 18 mol percent 2-butene, and 5 mol percent n-butane. From the result given in Table I,

*Table I*

ALKYLATION OF ISOBUTANE WITH 2-BUTENE IN THE PRESENCE OF ALUMINUM CHLORIDE AND IN THE PRESENCE OF ALUMINUM CHLORIDE PLUS $NiAl_2$

| Run No | 1 | 2 | 3 | 4 |
|---|---|---|---|---|
| Catalyst, Kind | $AlCl_3$ | $AlCl_3$ | $AlCl_3$ | $AlCl_3$ |
| Catalyst, g | 3 | 1 | 1.5 | 2 |
| Secondary Agent | | (¹) | (¹) | (¹) |
| Secondary Agent, g | | 20 | 20 | 20 |
| Initial Charge: $i-C_4+i-C_3H_7Cl$ (0.25 vol. percent), cc | 100 | 100 | 100 | 100 |
| Charge Stock: $i-C_4+2-C_4=$, cc | 400 | 400 | 400 | 400 |
| Pressure, Initial, p.s.i.g | 55 | 50 | 50 | 50 |
| Pressure, Max., p.s.i.g | 95 | 85 | 95 | 85 |
| Temperature, Initial, ° C | 24 | 23 | 23 | 21 |
| Temperature, Max., ° C | 30 | 31 | 31 | 30 |
| Products Recovered, wt. percent: | | | | |
| Cond. Gas | 75.3 | 72.1 | 70.2 | 67.3 |
| $C_5$—216° C | 20.8 | 26.1 | 28.3 | 31.7 |
| Bottoms | 3.9 | 1.8 | 1.5 | 1.0 |
| Distribution of IBP—216° C.: | | | | |
| Fraction, Vol. Percent— | | | | |
| IBP—65° C | 6.2 | 8.7 | 8.9 | 12.5 |
| 65–95 | 8.0 | 6.0 | 5.4 | 6.6 |
| 95–120 | 66.3 | 67.0 | 70.0 | 60.6 |
| 120–216 | 19.5 | 18.3 | 15.7 | 20.3 |
| Wt. percent yield: $C_5+$Liquid Prod./$2-C_4=$ Charged | 173 | 199 | 212 | 233 |
| Analysis of Cond. Gas: | | | | |
| $C_4$- Wt. Percent— | | | | |
| $C_3H_8$ | | | | |
| $i-C_4H_{10}$ | 91.8 | 91.7 | 92.6 | 91.7 |
| $n-C_4H_{10}$ | 6.6 | 6.7 | 6.8 | 8.0 |
| $C_4H_8$ | 1.6 | 1.6 | 0.6 | 0.3 |
| Octane No. (F–1) Clear | 96.4 | 96.2 | 95.1 | 93.2 |

¹ Raney nickel alloy.

Run 1.—As an example of the manner of conducting these experiments the following detailed description of run No. 1 is given: Into a one liter steel turbomixer autoclave was sealed 3 grams of aluminum chloride. Next, 100 cc. of isobutane containing 0.25 volume pershowing a yield of 199 weight percent $C_5+$ liquid product it is obvious that a beneficial effect was obtained by the utilization of the physical combination of aluminum chloride and $NiAl_2$. This result was obtained utilizing only ⅓ as much aluminum chloride as had been used in run 1 described hereinabove. The F-1 clear octane number of this product is exceedingly high, namely, 96.2. Bottoms or sludge formation dropped from 3.9 weight percent with aluminum chloride alone to a value of 1.8 weight percent, a significant decrease.

Run 3.—In this experiment, the combination catalyst utilized was prepared by grinding together 1.5 grams of aluminum chloride and 20 grams of $NiAl_2$. Here again, a high yield of $C_5+$ liquid product was obtained, namely, 212 weight percent. The octane number of this product is again very high, 95 F-1 clear. The fact that it is somewhat lower than that obtained in runs 1 and 2 is due to a longer than necessary reaction time which results in isomerization of some of the higher octane number components to lower octane number components. The bottoms or sludge formation is again decreased in this experiment to a value of 1.5 weight percent.

Run 4.—In this experiment 2 grams of aluminum chloride were ground together with 20 grams of $NiAl_2$. The yield of $C_5+$ liquid product was again increased, this time to a value of 233 weight percent. The amount of bottoms or sludge formation was again decreased to a value of 1.0 weight percent. The octane number of this product is again exceedingly high, namely, 93.2 F-1 clear. It again shows a slight decrease due to isomerization of higher octane number components to components of lower octane numbers. In all of these experiments no cracking was observed as is shown by the lack of propane in the analyses of the condensable gases.

EXAMPLE II

This example illustrates the alkylation of isobutane with 2-butene in the presence of the catalyst composition of the present invention comprising aluminum chloride and a Raney nickel alloy, $NiAl_2$. These experiments illustrate the effect of increasing the quantity of Raney nickel alloy holding the aluminum chloride quantity constant. These two experiments were carried out at temperatures ranging from about 25 to about 30° C. and at pressures ranging from about 50 to about 100 pounds per square inch. The conditions for the reactions, quantities of reactants utilized, and results obtained are summarized in the following Table II.

Table II

ALKYLATION OF ISOBUTANE WITH 2-BUTENE IN THE PRESENCE OF ALUMINUM CHLORIDE AND $NiAl_2$

| Run No | 5 | 6 |
|---|---|---|
| Catalyst, Kind | $AlCl_3$ | $AlCl_3$ |
| Catalyst, g | 2 | 2 |
| Secondary Agent | (1) | (1) |
| Secondary Agent, g | 20 | 40 |
| Initial Charge: i-$C_4$+i-$C_3H_7Cl$ (0.25 vol. percent), cc | 100 | 100 |
| Charge Stock: i-$C_4$+2-$C_4$=, cc | 400 | 400 |
| Pressure, Initial, p.s.i.g | 50 | 50 |
| Pressure, Max., p.s.i.g | 85 | 80 |
| Temperature, Initial, °C | 21 | 21 |
| Temperature, Max., °C | 30 | 30 |
| Products Recovered, wt. Percent: | | |
| Cond. Gas | 67.3 | 67.9 |
| $C_5$—216° C | 31.7 | 30.4 |
| Bottoms | 1.0 | 1.7 |
| Distribution of IBP—216° C.: | | |
| Fraction, Vol. Percent— | | |
| IBP—65° C | 12.5 | 11.7 |
| 65–95 | 6.6 | 8.3 |
| 95–120 | 60.6 | 59.6 |
| 120–216 | 20.3 | 20.4 |
| Wt. percent yield: $C_5+$ Liquid Prod./2-$C_4$= Charged | 233 | 228 |
| Analysis of Cond. Gas: | | |
| $C_4$- Wt. Percent— | | |
| $C_3H_8$ | | |
| i-$C_4H_{10}$ | 91.7 | 91.8 |
| n-$C_4H_{10}$ | 8.0 | 7.8 |
| $C_4H_8$ | 0.3 | 0.4 |
| Octane No. (F-1) Clear | 93.2 | 89.8 |

1 Raney nickel alloy.

Run 5.—The catalyst utilized in this experiment was prepared by grinding together 2 grams of aluminum chloride and 20 grams of $NiAl_2$. The charge stock utilized in this run and in run 6, described hereinafter, contained 77 mol percent isobutane, 18 mol percent 2-butene, and 5 mol percent n-butane. With the 2 grams of aluminum chloride in physical admixture with 20 grams of Raney nickel alloy there was obtained a yield of 233 weight percent $C_5+$ liquid product. The octane number of the product is high, namely, 93.2 F-1 clear and the yield of bottoms or sludge was low comprising 1.0 weight percent of the recovered products.

Run 6.—The catalyst utilized in this experiment was prepared by grinding together 2 grams of aluminum chloride and 40 grams of $NiAl_2$. A $C_5+$ liquid product yield of 228 weight percent was obtained in this experiment. The amount of bottoms or sludge increased somewhat to 1.72 percent of the recovered products in comparison to the 1.0 weight percent obtained using less Raney nickel alloy. The catalyst for this experiment was active as indicated by the yield of product but the reaction time utilized was longer than necessary as shown by the degraded octane number of the product, namely, 89.8 F-1 clear.

EXAMPLE III

This example illustrates the alkylation of isobutane with 2-butene in the presence of the catalyst composition of the present invention comprising aluminum chloride and Raney nickel alloy. These two experiments were carried out at temperatures ranging from about 20 to about 35° C. and at pressures from about 50 to 125 pounds per square inch. These two experiments illustrate the effect of changing isobutane to olefin ratio in the reaction zone. The conditions for the reactions, quantities of reactants utilized, and the results obtained are summarized in the following Table III.

Table III

ALKYLATION OF ISOBUTANE WITH 2-BUTENE IN THE PRESENCE OF $AlCl_3$ AND $NiAl_2$

| Run No | 7 | 8 |
|---|---|---|
| Catalyst, Kind | $AlCl_3$ | $AlCl_3$ |
| Catalyst, g | 2 | 2 |
| Secondary Agent | (1) | (1) |
| Secondary Agent, g | 40 | 40 |
| Initial Charge: i-$C_4$+i-$C_3H_7Cl$ (0.25 vol. percent), cc | 100 | 100 |
| Charge Stock: i-$C_4$+2-$C_4$=, cc | 400 | 600 |
| Pressure, Initial, p.s.i.g | 50 | 55 |
| Pressure, Max., p.s.i.g | 80 | 115 |
| Temperature, Initial, °C | 21 | 22 |
| Temperature, Max., °C | 30 | 34 |
| Products Recovered, wt. percent: | | |
| Cond. Gas | 67.9 | 69.2 |
| $C_5$—216° C | 30.4 | 28.5 |
| Bottoms | 1.7 | 2.3 |
| Distribution of IBP—216° C.: | | |
| Fraction, Vol. Percent— | | |
| IBP—65° C | 11.7 | 20.7 |
| 65–95 | 8.3 | 5.3 |
| 95–120 | 59.6 | 56.2 |
| 120–216 | 20.4 | 17.8 |
| Wt. percent yield: $C_5+$ Liquid Prod./2-$C_4$= Charged | 228 | 194 |
| Analysis of Cond. Gas: | | |
| $C_4$- Wt. Percent— | | |
| $C_3H_8$ | | |
| i-$C_4H_{10}$ | 91.8 | 91.6 |
| n-$C_4H_{10}$ | 7.8 | 7.1 |
| $C_4H_8$ | 0.4 | 1.3 |
| Octane No. (F-1) Clear | 89.8 | 96.5 |

1 Raney nickel alloy.

Run 7.—The catalyst utilized in this experiment was prepared by grinding together 2 grams of aluminum chloride with 40 grams of Raney nickel alloy. The mol ratio of isobutane to olefin in this experiment is about 5.6 to 1. Examination of the results obtained show that a 228 weight percent yield of $C_5+$ liquid product was obtained. At the same time, the bottoms or sludge formation amount to 1.7 weight percent of the products recovered. The octane number of the product of 89.8 is somewhat degraded due to isomerization, as set forth hereinabove.

Run 8.—The catalyst for this experiment was again prepared by grinding together 2 grams of aluminum chloride and 40 grams of Raney nickel alloy. However, instead of adding 400 cc. of charge stock to the reactor as described hereinabove in Example II, 600 cc. of charge stock was added to the reactor. This charge stock contained 77 mol percent isobutane, 19 mol percent 2-butene, and 4 mol percent n-butane. This increase in charge stock drops the isobutane to olefin ratio in the reactor from about 5.6 to 5.2. Examination of Table III shows that this resulted in a decrease of the formation of $C_5+$ liquid product, the yield in this case being 194 weight percent. Also, sludge formation rose to 2.3 weight percent of the products recovered. The high octane number of 96.5 for this product shows that this catalyst was very active during the run.

EXAMPLE IV

This example illustrates the utilization of hydrogen in conjunction with the catalyst compositions of the present invention for the alkylation of isobutane with 2-butene. In each experiment the amount of aluminum chloride was held constant but the amount of Raney nickel alloy and hydrogen was varied. These experiments were carried out at temperatures ranging from 20 to about 35° C. and at pressures ranging from about 50 to about 925 pounds per square inch. The conditions for the reactions, quantities of reactants utilized, and results obtained are summarized in the following Table IV.

uct. At the same time bottoms or sludge formation amounted to 1.7 weight percent of the products recovered. This decrease in yield and increase in bottoms formation is probably due to the utilization of too much hydrogen since the prior art teaches that alkylation can be stopped in this manner.

*Run 11.*—The catalyst for this experiment was prepared by grinding together 2 grams of aluminum chloride and 40 grams of Raney nickel alloy. No hydrogen was utilized in this experiment. From examination of Table IV it is apparent that a high yield of liquid product was obtained, namely, 228 weight percent $C_5+$ liquid product. At the same time, bottoms or sludge formation amounted to 1.7 weight percent of the products recovered. The octane number of the product is degraded by isomerization as described hereinabove.

*Run 12.*—The catalyst for this experiment was prepared again by grinding together 2 grams of aluminum chloride and 40 grams of Raney nickel alloy. After addition of the initial isobutane and after addition of the charge stock, the reactor was pressured by adding thereto 400 p.s.i.g. of hydrogen. From Table IV it will be seen that the yield of $C_5+$ liquid product obtained was 202.8 weight percent. This is somewhat lower again than was obtained

*Table IV*

ALKYLATION OF ISOBUTANE WITH 2-BUTENE IN THE PRESENCE OF HYDROGEN, ALUMINUM CHLORIDE, AND A RANEY NICKEL ALLOY

| Run No. | 9 | 10 | 11 | 12 |
|---|---|---|---|---|
| Catalyst, Kind | $AlCl_3$ | $AlCl_3$ | $AlCl_3$ | $AlCl_3$ |
| Catalyst, g | 2 | 2 | 2 | 2 |
| Secondary Agent | (1) | (1) | (1) | (1) |
| Secondary Agent, g | 20 | 20 | 40 | 40 |
| Initial Charge: i-$C_4$+i-$C_3H_7Cl$ (0.25 vol. percent), cc | 100 | 100 | 100 | 100 |
| Charge Stock: i-$C_4$+2-$C_4$=, cc | 400 | 400 | 400 | 400 |
| Pressure, Initial, p.s.i.g | 50 | 2 750 | 50 | 3 475 |
| Pressure, Max., p.s.i.g | 85 | 920 | 80 | 740 |
| Temperature, Initial, ° C | 21 | 25 | 21 | 24 |
| Temperature, Max., ° C | 30 | 32 | 30 | 35 |
| Products Recovered, wt. percent: | | | | |
|   Cond. Gas | 67.3 | 69.2 | 67.9 | 69.9 |
|   $C_5$—216° C | 31.7 | 29.1 | 30.4 | 29.2 |
|   Bottoms | 1.0 | 1.7 | 1.7 | 0.9 |
| Distribution of IBP—216° C.: | | | | |
|   Fraction, Vol. percent— | | | | |
|     IBP—65° C | 12.5 | 10.7 | 11.7 | 19.7 |
|     65-95 | 6.6 | 4.3 | 8.3 | 5.1 |
|     95-120 | 60.6 | 64.5 | 59.6 | 60.5 |
|     120-216 | 20.3 | 20.5 | 20.4 | 14.7 |
| Wt. percent yield: $C_5+$ Liquid Prod./2-$C_4$= Charged | 233 | 219 | 228 | 202.8 |
| Analysis of Cond. Gas: | | | | |
|   $C_4^-$ Wt. percent— | | | | |
|     $C_3H_8$ | | | | |
|     i-$C_4H_{10}$ | 91.7 | 93.8 | 91.8 | 93.0 |
|     n-$C_4H_{10}$ | 8.0 | 6.2 | 7.8 | 7.0 |
|     $C_4H_8$ | 0.3 | | 0.4 | |
| Octane No. (F-1) Clear | 93.2 | | 89.8 | 93.9 |

1 Raney nickel alloy.
2 700 p.s.i.g. $H_2$ added.
3 400 p.s.i.g. $H_2$ added.

*Run 9.*—The catalyst for this experiment was prepared by grinding together 2 grams of aluminum chloride and 20 grams of Raney nickel alloy. No hydrogen was utilized in this experiment. The charge stock utilized for this run and runs 10 and 11 contained 77 mol percent isobutane, 18 mol percent 2-butene, and 5 mol percent n-butane. A 233 weight percent yield of $C_5+$ liquid product was obtained along with 1.0 weight percent bottoms or sludge. The octane number of the product was 93.2.

*Run 10.*—The catalyst for this experiment again was prepared by grinding together 2 grams of aluminum chloride and 20 grams of Raney nickel alloy. After introduction of the initial charge of 100 cc. of isobutane 400 cc. charge stock, the reactor was pressured by adding thereto 700 p.s.i.g. hydrogen. From this experiment was obtained a 219 weight percent yield of $C_5+$ liquid prodin the absence of hydrogen. In this case, however, the bottoms or sludge formation decreased from the 1.7 weight percent of the products recovered in the experiment without hydrogen to 0.9 weight percent of the products recovered from this run 12. The octane number of this product is high, namely, 93.9.

EXAMPLE V

This example illustrates the alkylation of isobutane with 2-butene in the presence of the catalyst composition of the present invention but in the absence of isopropyl chloride activator utilized in the previous runs. This experiment was carried out at a temperature ranging from about 45 to about 50° C. and at a pressure ranging from 75 to about 100 p.s.i.g. The conditions for the reaction, quantity of reactants utilized, and results obtained are summarized in the following Table V.

Table V
ALKYLATION OF ISOBUTANE WITH 2-BUTENE IN THE PRESENCE OF AlCl₃ AND NiAl₃

| Run No | 13 |
|---|---|
| Catalyst, Kind | Al₃Cl₃ |
| Catalyst, g | 3 |
| Secondary Agent | (¹) |
| Secondary Agent, g | 30 |
| Initial Charge: i-C₄+i-C₃H₇Cl (0.25 vol. percent), cc | ² 200 |
| Charge Stock: i-C₄+2-C₄=, cc | 400 |
| Pressure, Initial, p.s.i.g | 75 |
| Pressure, Max., p.s.i.g | 100 |
| Temperature, Initial, ° C | 45 |
| Temperature, Max., ° C | 51 |
| Products Recovered, wt. percent: | |
| Cond. Gas | 74.5 |
| C₅—216° C | 24.4 |
| Bottoms | 1.1 |
| Distribution of IBP—216° C.: | |
| Fraction, Vol. percent— | |
| IBP—65° C | 35.8 |
| 65–95 | 5.2 |
| 95–120 | 41.8 |
| 120–216 | 17.2 |
| Wt. percent yield: C₅+ Liquid Prod./2-C₄=Charged | 194.9 |
| Analysis of Cond. Gas: | |
| C₄- Wt. percent— | |
| C₃H₈ | |
| i-C₄H₁₀ | 94.0 |
| n-C₄H₁₀ | 4.9 |
| C₄H₈ | 1.1 |
| Octane No. (F–1) Clear | |

¹ Raney nickel alloy.
² No i-C₃H₇Cl added.

*Run 13.*—The catalyst utilized in this experiment was prepared by grinding together 3 grams of aluminum chloride and 30 grams of Raney nickel alloy. The charge stock utilized contained 76 mol percent isobutane, 20 mol percent 2-butene, and 4 mol percent n-butane. In contrast to the procedure described hereinabove for run 1, in this experiment the initial charge to the reactor was 200 cc. of isopropyl chloride-free isobutane. Then, the 400 cc. of charge stock was added. From Table V it will be seen that a 194.9 weight percent yield of C₅+ liquid product was obtained. Bottoms formation amounted to 1.1 weight percent of the products recovered. Thus, it is shown that isopropyl chloride or HCl or other activators are not necessary, but can be utilized when so desired.

I claim as my invention:

1. An alkylation process which comprises contacting an alkylatable saturated hydrocarbon with an olefin-acting compound at alkylation conditions in the presence of a catalyst comprising a physical mixture of a Friedel-Crafts metal halide and a Raney nickel alloy.

2. An alkylation process which comprises contacting an alkylatable acyclic paraffin hydrocarbon with an olefin-acting compound at alkylation conditions in the presence of a catalyst comprising a physical mixture of a Friedel-Crafts metal halide and a Raney nickel alloy.

3. An alkylation process which comprises contacting an alkylatable cycloparaffin hydrocarbon with an olefin-acting compound at alkylation conditions in the presence of a catalyst comprising a physical mixture of a Friedel-Crafts metal halide and a Raney nickel alloy.

4. An alkylation process which comprises contacting an isoparaffinic hydrocarbon with an olefin-acting compound at alkylation conditions in the presence of a catalyst comprising a physical mixture of a Friedel-Crafts metal halide and a Raney nickel alloy.

5. An alkylation process which comprises contacting an isoparaffinic hydrocarbon with an olefin-acting compound at alkylation conditions in the presence of a catalyst comprising a physical mixture of aluminum chloride and a Raney nickel alloy.

6. An alkylation process which comprises contacting an isoparaffinic hydrocarbon with an olefinic hydrocarbon at alkylation conditions in the presence of a catalyst comprising a physical mixture of a Friedel-Crafts metal halide and a Raney nickel alloy.

7. An alkylation process which comprises contacting an isoparaffinic hydrocarbon with an olefinic hydrocarbon at alkylation conditions in the presence of a catalyst comprising a physical mixture of aluminum chloride and a Raney nickel alloy.

8. An alkylation process which comprises contacting isobutane with an olefin-acting compound at alkylation conditions in the presence of a catalyst comprising a physical mixture of a Friedel-Crafts metal halide and a Raney nickel alloy.

9. An alkylation process which comprises contacting isobutane with an olefin-acting compound at alkylation conditions in the presence of a catalyst comprising a physical mixture of aluminum chloride and a Raney nickel alloy.

10. An alkylation process which comprises contacting isobutane with an olefinic hydrocarbon at alkylation conditions in the presence of a catalyst comprising a physical mixture of a Friedel-Crafts metal halide and a Raney nickel alloy.

11. An alkylation process which comprises contacting isobutane with an olefinic hydrocarbon at alkylation conditions in the presence of a catalyst comprising a physical mixture of aluminum chloride and a Raney nickel alloy.

12. An alkylation process which comprises contacting isobutane with ethylene at alkylation conditions in the presence of a catalyst comprising a physical mixture of a Friedel-Crafts metal halide and a Raney nickel alloy.

13. An alkylation process which comprises contacting isobutane with propylene at alkylation conditions in the presence of a catalyst comprising a physical mixture of a Friedel-Crafts metal halide and a Raney nickel alloy.

14. An alkylation process which comprises contacting isobutane with a butene at alkylation conditions in the presence of a catalyst comprising a physical mixture of a Friedel-Crafts metal halide and a Raney nickel alloy.

15. An alkylation process which comprises contacting isobutane with ethylene at alkylation conditions in the presence of a catalyst comprising a physical mixture of aluminum chloride and NiAl₂.

16. An alkylation process which comprises contacting isobutane with propylene at alkylation conditions in the presence of a catalyst comprising a physical mixture of aluminum chloride and NiAl₂.

17. An alkylation process which comprises contacting isobutane with a butene at alkylation conditions in the presence of a catalyst comprising a physical mixture of aluminum chloride and NiAl₂.

18. An alkylation process which comprises contacting isobutane with 1-butene at alkylation conditions in the presence of a catalyst comprising a physical mixture of aluminum chloride and NiAl₂.

19. An alkylation process which comprises contacting isobutane with 2-butene at alkylation conditions in the presence of a catalyst comprising a physical mixture of aluminum chloride and NiAl₂.

20. The process of claim 1 further characterized in that said alloy consists essentially of nickel and aluminum.

References Cited in the file of this patent
UNITED STATES PATENTS

| | | |
|---|---|---|
| 2,217,019 | Ipatieff et al. | Oct. 8, 1940 |
| 2,355,339 | Story | Aug. 8, 1944 |
| 2,406,622 | Mavity | Aug. 27, 1946 |
| 2,546,180 | Wiczer | Mar. 27, 1951 |